Patented Apr. 3, 1951

2,546,960

UNITED STATES PATENT OFFICE 2,546,960

GAMMA NITRO-GAMMA,GAMMA DICARBALKOXY - BUTYRALDEHYDES AND PROCESS

Owen A. Moe and Donald T. Warner, Minneapolis, Minn., assignors to General Mills, Inc., a corporation of Delaware No Drawing. Application February 24, 1948, Serial No. 10,557

8 Claims. (Cl. 260—483)

The present invention relates to the preparation of various nitroaldehydes which are particularly useful for the synthesis of various amino acids and which are also useful for other syntheses.

The aldehydo compounds contemplated by the present invention may be illustrated by the following formula:

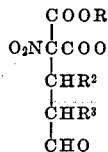

in which R, R$^1$, R$^2$, and R$^3$ represent hydrogen or low aliphatic groups such as methyl, ethyl, propyl, butyl, and the like, and may be alike or different. The aldehydes in which R$^2$ and R$^3$ are hydrogen are useful in the preparation of tryptophane, lysine, ornithine, proline, and numerous other compounds. The aldehydes in which R$^2$ or R$^3$ are alkyl are suitable for the synthesis of alkyl-substituted amino acids, as well as other compounds.

It is, therefore, an object of the present invention to provide novel aldehydo compounds which are particularly useful for the synthesis of amino acids.

It is another object of the present invention to provide a novel process of producing these compounds.

These and other objects of the invention will be more fully apparent from the following description, with particular reference to specific examples which are to be understood as illustrative only and not as limiting the invention.

These aldehydo compounds may be prepared by the 1,4 addition of alpha,beta-unsaturated aldehydes to nitromalonic esters in accordance with the following reaction:

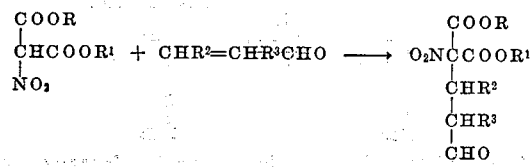

wherein R, R$^1$, R$^2$ and R$^3$ are as above defined.

Typical of this type of reaction is the addition of nitromalonic ester to acrolein. Ethyl nitromalonate may be readily prepared according to the same procedure given in the literature for the preparation of methyl nitromalonate by Arndt and Rose, J. Chem. Soc., 1 (1935). The reaction of the nitromalonate and acrolein involves the admixing of these reactants in the presence of a basic catalyst and preferably in the presence of a solvent. Suitable catalysts include alkali metal alkoxides such as sodium ethoxide, and tertiary low aliphatic amines such as tributyl amine, triethyl amine, tripropyl amine, and the like. Suitable solvents include absolute ethanol and benzene. The reaction proceeds smoothly to a high yield of the desired aldehyde compound. The following examples will serve to illustrate the invention.

EXAMPLE 1

Ten grams of ethyl nitromalonate were dissolved in 60 cc. of absolute ethanol. Three cc. of acrolein were added at once and no rise in the reaction temperature was noted. Twenty mg. of sodium metal were added, and the temperature increased from 24° to 28° C. An additional quantity (20 mg.) of metallic sodium was added and the temperature increased to 36° C. After stirring for approximately 30 minutes, another small portion (approximately 10 mg.) of metallic sodium was added. After stirring for one hour at room temperature, the reaction mixture was treated with glacial acetic acid (0.15 gm.), to yield a solution of gamma nitro,gamma-gamma dicarbethoxy butyraldehyde. Removal of solvent from a portion of this solution by distillation yielded a residual oil which was the aldehydo compound.

Nine grams of 2,4-dinitrophenylhydrazine were mixed with 500 cc. of ethanol, and after heating to the boiling point the remainder of the alcoholic solution of the aldehydo compound was added. At the reflux temperature of the resulting reaction mixture, 10 cc. of concentrated hydrochloric acid were added and the reaction mixture was boiled for an additional 2 minutes. The reaction mixture was filtered and the filtrate was permitted to cool slowly. The formation of platelet-type crystals was noted. The precipitated 2,4-dinitrophenylhydrazone was collected by filtration and dried. The product thus obtained weighed 11 g. and melted at 70-73° C. The filtrate was diluted with water and an additional quantity of product (4 g.) was collected. This melted at 60-64° C. Further dilution with water yielded an additional quantity (2.7 g.) of material which began to melt at approximately 50° C. The entire quantity (17.7 g.) of material collected was recrystallized from ethanol. Thirteen grams of the 2,4-dinitrophenylhydrazone were obtained, melting at 73-75° C. Further purification by recrystallization from ethanol increased the melting point to 75-77° C. Analysis calc. for $C_{16}H_{19}O_{10}N_5$: C, 43.54; H, 4.31. Found: C, 43.71; H, 4.39.

EXAMPLE 2

Ten grams of ethyl nitromalonate were dissolved in 60 cc. of absolute ethanol, three cc. of acrolein were added with stirring and the reaction temperature did not increase. Two cc. of tributyl amine were added in 1 cc. portions and the reaction temperature increased to 36° C. The reaction mixture was cooled and permitted to stand overnight. Removal of the solvent by distillation from a portion of the reaction mixture yielded a residual oil which was gamma nitro, gamma, gamma dicarbethoxy butyraldehyde.

A ten cc. portion of the above reaction mixture was mixed with 0.5 g. of 2,4-dinitrophenylhydrazine in 50 cc. of absolute ethanol. The resulting reaction mixture was heated to the reflux temperature. Then 1.5 cc. of concentrated hydrochloric acid was added. The resulting clear, light yellow solution was filtered and the filtrate yielded an oil which rapidly solidified. The solid product was collected by filtration and dried. It started to melt at about 50° C. and appeared to be quite completely melted at 70° C. Purification by recrystallization from ethanol yielded the desired 2,4-dinitrophenylhydrazone melting at 75-77° C.

EXAMPLE 3

Ten grams of ethyl nitromalonate were dissolved in 60 cc. of benzene. The addition of 3 cc. of acrolein showed no increase in the reaction temperature. The addition of 2 cc. of tributyl amine increased the reaction temperature quite rapidly to 37° C. After stirring for 2 hours at room temperature, a 10 cc. portion of this reaction mixture was treated with 2,4-dinitrophenylhydrazine in the usual manner. The resulting 2,4-dinitrophenylhydrazone separated as small platelets and melted at 73-75° C. Recrystallization increased the melting point to 75-76° C. No depression in the melting point was observed when mixed with the previous samples. Vacuum evaporation of a further portion of the original reaction mixture yielded the desired aldehyde as a residual oil.

While these examples have been with reference to ethyl nitromalonate, other low aliphatic esters of nitromalonic acid may be used, such as methyl, propyl, butyl, and other esters. Likewise in place of acrolein, methacrolein may be used to produce aldehydes in which $R^3$ is methyl. Crotonaldehyde is useful in this reaction to produce compounds in which $R^2$ is methyl.

These aldehydes are useful in numerous syntheses. For purpose of illustration, the syntheses of tryptophane, lysine, ornithine, and proline from gamma-nitro-gamma, gamma-dicarbethoxy butyraldehyde are illustrated as follows:

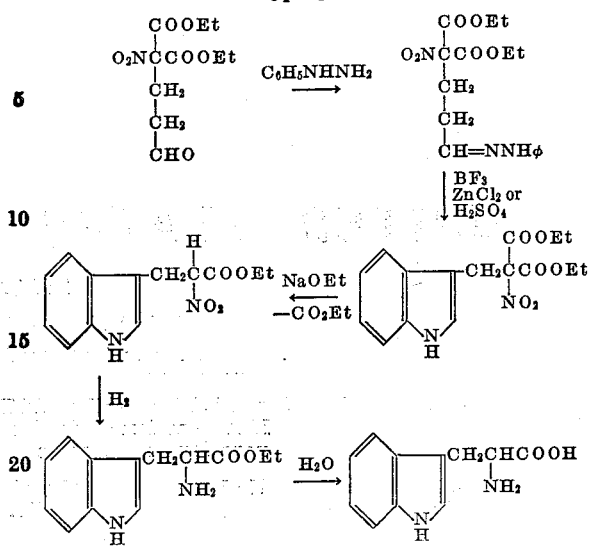

where T is oxime, aldimine, phenylhydrazone, or semicarbazone.

*Proline*

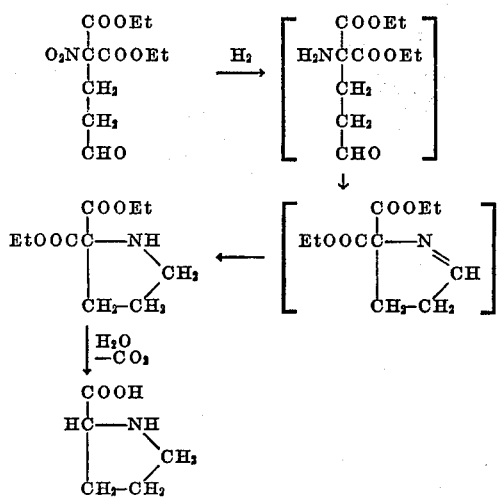

While various modifications of the invention have been described, it is to be understood that this invention is not limited thereto, but other modifications may be made without departing from the spirit of the invention.

We claim as our invention:

1. Aldehydo compounds having the following formula:

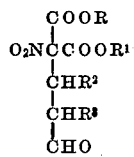

in which R and $R^1$ are low alkyl groups containing from one to four carbon atoms, and $R^2$ and $R^3$ are selected from the group consisting of hydrogen and methyl.

2. Process of producing gamma-nitro-gamma, gamma-dicarbethoxy butyraldehyde which comprises reacting ethyl nitromalonate with acrolein in the presence of a small amount of alkaline catalyst.

3. Gamma-nitro, gamma-gamma dicarbethoxy butyraldehyde.

4. Alpha - methyl - gamma - nitro - gamma, gamma-dicarbethoxy butyraldehyde.

5. Beta-methyl-gamma-nitro-gamma,gamma-dicarbethoxy butyraldehyde.

6. Process of producing aldehydo compounds having the formula

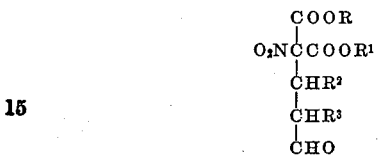

which comprises reacting the compound

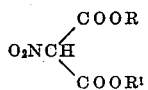

in which R and $R_1$ are alkyl groups containing from one to four carbon atoms, with an aldehyde having the formula $$CHR^2=CHR^3CHO$$

in which $R^2$ and $R^3$ are selected from the group consisting of hydrogen and methyl, in the presence of an alkaline catalyst.

7. Process of producing alpha-methyl-gamma-nitro - gamma,gamma - dicarbethoxy butyraldehyde which comprises reacting ethyl nitromalonate with methacrolein in the presence of a small amount of alkaline catalyst.

8. Process of producing beta-methyl-gamma-nitro - gamma,gamma - dicarbethoxy butyraldehyde which comprises reacting ethyl nitromalonate with crotonaldehyde in the presence of a small amount of alkaline catalyst.

OWEN A. MOE.
DONALD T. WARNER.

No references cited.